US008806652B2

(12) United States Patent
Bjones et al.

(10) Patent No.: US 8,806,652 B2
(45) Date of Patent: *Aug. 12, 2014

(54) PRIVACY FROM CLOUD OPERATORS

(71) Applicant: Microsoft Corporation, Redmond, WA (US)

(72) Inventors: Ronald John Kamiel Euphrasia Bjones, Dilbeek (BE); Kim Cameron, Bellevue, WA (US); Anthony Joseph Nadalin, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 62 days.

This patent is subject to a terminal disclaimer.

(21) Appl. No.: 13/705,179

(22) Filed: Dec. 5, 2012

(65) Prior Publication Data

US 2013/0276131 A1 Oct. 17, 2013

Related U.S. Application Data

(60) Provisional application No. 61/625,641, filed on Apr. 17, 2012.

(51) Int. Cl.
G06F 21/00 (2013.01)
H04L 29/06 (2006.01)
G06F 21/62 (2013.01)

(52) U.S. Cl.
CPC ........ *H04L 63/0884* (2013.01); *G06F 21/6263* (2013.01); *H04L 63/0807* (2013.01)
USPC ............................................. 726/26; 713/193

(58) Field of Classification Search
CPC .................................................. H04L 63/0421
See application file for complete search history.

(56) References Cited

U.S. PATENT DOCUMENTS

| | | |
|---|---|---|
| 5,815,665 A | 9/1998 | Teper et al. |
| 7,146,435 B2 | 12/2006 | Williams |
| 7,536,184 B2 | 5/2009 | Poczo |
| 7,788,729 B2 | 8/2010 | Cameron et al. |
| 7,979,899 B2 | 7/2011 | Guo et al. |
| 8,073,783 B2 | 12/2011 | Felsted |
| 8,112,405 B2 | 2/2012 | Shiloh |
| 8,190,884 B2 | 5/2012 | Alroy et al. |
| 2003/0080997 A1 | 5/2003 | Fuehren |
| 2007/0156766 A1 | 7/2007 | Hoang |
| 2007/0184830 A1 | 8/2007 | Sullivan et al. |

(Continued)

OTHER PUBLICATIONS

"OIX Open Identity Exchange: Trust Framework Requirements and Guidelines V1 (DRAFT 01)" Published Jan. 17, 2011 (7 pages) http://openidentityexchange.org/sites/defaultifiles/OIX%20Trust%20Framework%20Requirements.pdf.

(Continued)

*Primary Examiner* — Gilberto Barron, Jr.
*Assistant Examiner* — Wayne An
(74) *Attorney, Agent, or Firm* — Ben Tabor; Kate Drakos; Micky Minhas

(57) ABSTRACT

Aspects of the subject matter described herein relate to identity technology. In aspects, even though a cloud operator may control one or all of the entities with which a user device interacts, the employees and computers controlled by the cloud operator may still have insufficient data to determine a natural identity of the user based on interactions of the user device with the cloud operator's computers. Privacy boundaries on the user device control transmission of natural identity information to other entities such that, without user consent, computers outside of the user device have insufficient data singly or combined to determine a natural identity of the user.

20 Claims, 9 Drawing Sheets

(56) References Cited

U.S. PATENT DOCUMENTS

| | | | |
|---|---|---|---|
| 2007/0234408 | A1 | 10/2007 | Burch et al. |
| 2008/0028453 | A1 | 1/2008 | Nguyen |
| 2009/0320103 | A1 | 12/2009 | Veeraraghavan et al. |
| 2010/0132019 | A1 | 5/2010 | Hardt |
| 2010/0214976 | A1 | 8/2010 | Libes et al. |
| 2010/0318806 | A1 | 12/2010 | Hardt |
| 2010/0325441 | A1 | 12/2010 | Laurie et al. |
| 2010/0325723 | A1 | 12/2010 | Essawi et al. |
| 2011/0010762 | A1 | 1/2011 | Nijdam et al. |
| 2011/0126010 | A1 | 5/2011 | Kim et al. |
| 2011/0145593 | A1 | 6/2011 | Auradkar et al. |
| 2011/0202991 | A1 | 8/2011 | Paquin et al. |
| 2011/0231919 | A1 | 9/2011 | Vangpat |
| 2012/0311689 | A1 | 12/2012 | Kron |

OTHER PUBLICATIONS

"OIX Open Identity Exchange: An Open Market Solution for Online Identity Assurance" Published Mar. 2010 (13 pages) http://openidentityexchange.org/sites/defaultlfiles/oix-white-paper-2010-03-02.pdf.

"Criterion White Paper: Federated Online Attribute Exchange Initiatives" Published Jun. 14, 2012 (7 pages) http://openidentityexchange.org/sites/defaultlfiles/Federated Online Attribute Exchange White Paper 6.pdf.

"OIX: The OIX Listing Service" © 2010 OIX [Article dated Mar. 12, 2011 as seen by Internet Archive] (2 pages) http://web.archive.org/web/2011 03121 05303/http://openidentityexchange.org/listing-service.

U.S. Statutory Invention Registration U.S. H1944 H, Cheswick, Feb. 6, 2001, 12 pages.

U.S. Appl. No. 13/655,436, Office Action mailed Jan. 31, 2014, 10 pages.

U.S. Appl. No. 13/628,044, Office Action mailed Dec. 20, 2013, 12 pages.

U.S. Appl. No. 13/682,743, Notice of Allowance mailed Feb. 19, 2014, 7 pages.

"The telecommunications world is experiencing disruptive changes in business models and revenue sources as a result of ongoing industry consolidation and the approaching convergence of Telecom, Media and Web networks", Retrieved at <<http://www.amsoft.net/markets/telecom.htm>>, Retrieved Date: Oct. 19, 2012, p. 1.

Geest, et al., "Managing Identity Trust for Access Control", Retrieved at <<http://msdn.microsoft.com/en-us/library/cc836395.aspx>>, Jul. 2008, pp. 10.

"Claims-Based Single Sign-On for the Web and Windows Azure", Retrieved at <<http://msdn.microsoft.com/en-us/library/ff359102.aspx>>, Feb. 3, 2010, pp. 24.

Rundle, et al., "The Open Identity Trust Framework (OITF) Model", Retrieved at <<http://openidentityexchange.org/sites/default/files/the-open-identity-trust-framework-model-2010-03.pdf>>, Mar. 2010, pp. 16.

"The Telcom Data Trust Framework", Retrieved at <<http://openidentityexchange.org/trust-frameworks/telcom-data>>, Retrieved Date: May 9, 2012, pp. 4.

Rial, et al., "Privacy-Preserving Smart Metering", Retrieved at <<http://research.microsoft.com/en-us/um/people/gdane/pfsm.pdf. pdf<<,WPES '11 Proceedings of the 10th annual ACM workshop on Privacy in the electronic society, Oct. 17, 2011, pp. 49-60.

Zhu, et al., "PPAB: A Privacy-Preserving Authentication and Billing Architecture for Metropolitan Area Sharing Networks", Retrieved at <<http://ieeexplore.ieee.org/stamp/stamp.jsp?tp=&arnumber=4657374>>, IEEE Transactions on Vehicular Technology, Jun. 2009, pp. 2529-2543.

Martinet, et al., "Cryptanalysis of a partially blind signature scheme or how to make $100 bills with $1 and $2", Retrieved at <<http://www.ssi.gouv.fr/archive/fr/sciences/fichiers/lcr/maposo06.pdf>>,FC'06 Proceedings of the 10th international conference on Financial Cryptography and Data Security, Feb. 27, 2006, pp. 171-176.

"Making sense of the National Strategy for Trusted Identities in Cyberspace (Part IV: Strawman Architecture)", Retrieved at <<http://www.educatedguesswork.org/2011/05/making_sense_of_the_national_s_3.html, May 25, 2011, pp. 2.

Molina-Markham, et al., "Designing Privacy-preserving Smart Meters with Low-cost Microcontrollers", Retrieved at http://fc12.ifca.ai/pre-proceedings/paper_29.pdf>>,IACR Cryptology ePrint Archive, Retrieved Date: May 16, 2012, pp. 15.

Tiwari, et al., "A Multi-Factor Security Protocol for Wireless Payment—Secure Web Authentication Using Mobile Devices", Retrieved at <<http://www.tifr.res.in/~sanyal/papers/Ayu_MultiFactorSecurityProtocol.pdf>>, IADIS International Conference Applied Computing 2007, Feb. 2007, pp. 160-167.

Chou, David, "Strong User Authentication on the Web", Retrieved at <<http://msdn.microsoft.com/en-us/library/cc838351.aspx>>, Aug. 2008, pp. 10.

Bertocci, Vittorio, "Claims and Identity: On-Premise and Cloud Solutions", Retrieved at <<http://msdn.microsoft.com/en-us/library/cc836390.aspx>>, Jul. 2008, pp. 15.

U.S. Appl. No. 13/682,743, filed Nov. 21, 2012, 66 pages.
U.S. Appl. No. 13/628,044, filed Sep. 27, 2012, 55 pages.
U.S. Appl. No. 13/652,478, filed Oct. 16, 2012, 73 pages.
U.S. Appl. No. 13/655,436, filed Oct. 18, 2012, 74 pages.
U.S. Appl. No. 13/688,210, filed Nov. 29, 2012, 75 pages.

Leung, et al., "Ninja : Non Identity Based, Privacy Preserving Authentication for Ubiquitous Environments", Retrieved at <<http://www.isg.rhul.ac.uk/cjm/nnibpp.pdf>>, In Proceedings of 9th International Conference on Ubiquitous Computing, Sep. 16, 2007, pp. 73-90.

Tian, et al., "Privacy Preserving Personalized Access Control Service at Third Service Provider", Retrieved at <<http://ieeexplore.ieee.org/stamp/stamp.jsp?tp=&arnumber=6009456>>, 2011 IEEE International Conference on Web Services, Jul. 4, 2011, pp. 694-695.

Slamanig, Daniel., "More Privacy for Cloud Users: Privacy-Preserving Resource Usage in the Cloud", Retrieved at <<http://petsymposium.org/2011/papers/hotpets11-final2Slamanig.pdf>>, 4th Hot Topics in Privacy Enhancing Technologies (HotPETs 2011), Jul. 27, 2011, pp. 13.

Bjones, et al., "Architecture Serving Complex Identity Infrastructures", Retrieved at <<http://www.trustindigitallife.eu/uploads/Architecture%20serving%20complex%20Identity%20Infrastructures.pdf>>, Feb. 2012, pp. 21.

U.S. Appl. No. 13/682,743, filed Nov. 21, 2012, Bjones.
U.S. Appl. No. 13/628,044, filed Sep. 27, 2012, Bjones.
U.S. Appl. No. 13/652,478, filed Oct. 16, 2012, Bjones.
U.S. Appl. No. 13/655,436, filed Oct. 18, 2012, Bjones.
U.S. Appl. No. 13/688,210, filed Nov. 29, 2012, Bjones.

PRIVACY FROM CLOUD OPERATORS

CROSS REFERENCE TO RELATED APPLICATION

This application claims the benefit of U.S. Provisional Application Ser. No. 61/625,641, filed Apr. 17, 2012, entitled IDENTITY, which application is incorporated herein in its entirety.

BACKGROUND

For many individuals, there is a great concern that their activities with entities on the Web may be tracked and linked to them. With sufficient identifying information, a criminal entity may be able to fake an identity and use it in harmful ways. Companies have tried to address this issue by developing various secure systems. Unfortunately, such systems are often too cumbersome or non-intuitive for users. Furthermore, such systems may allow a company to track activities of individuals on the Web. This leads to mistrust and poor adoption of such systems.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to identity technology. In aspects, even though a cloud operator may control one or all of the entities with which a user device interacts, the employees and computers controlled by the cloud operator may still have insufficient data to determine a natural identity of the user based on interactions of the user device with the cloud operator's computers. Privacy boundaries on the user device control transmission of natural identity information to other entities such that, without user consent, computers outside of the user device have insufficient data singly or combined to determine a natural identity of the user.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
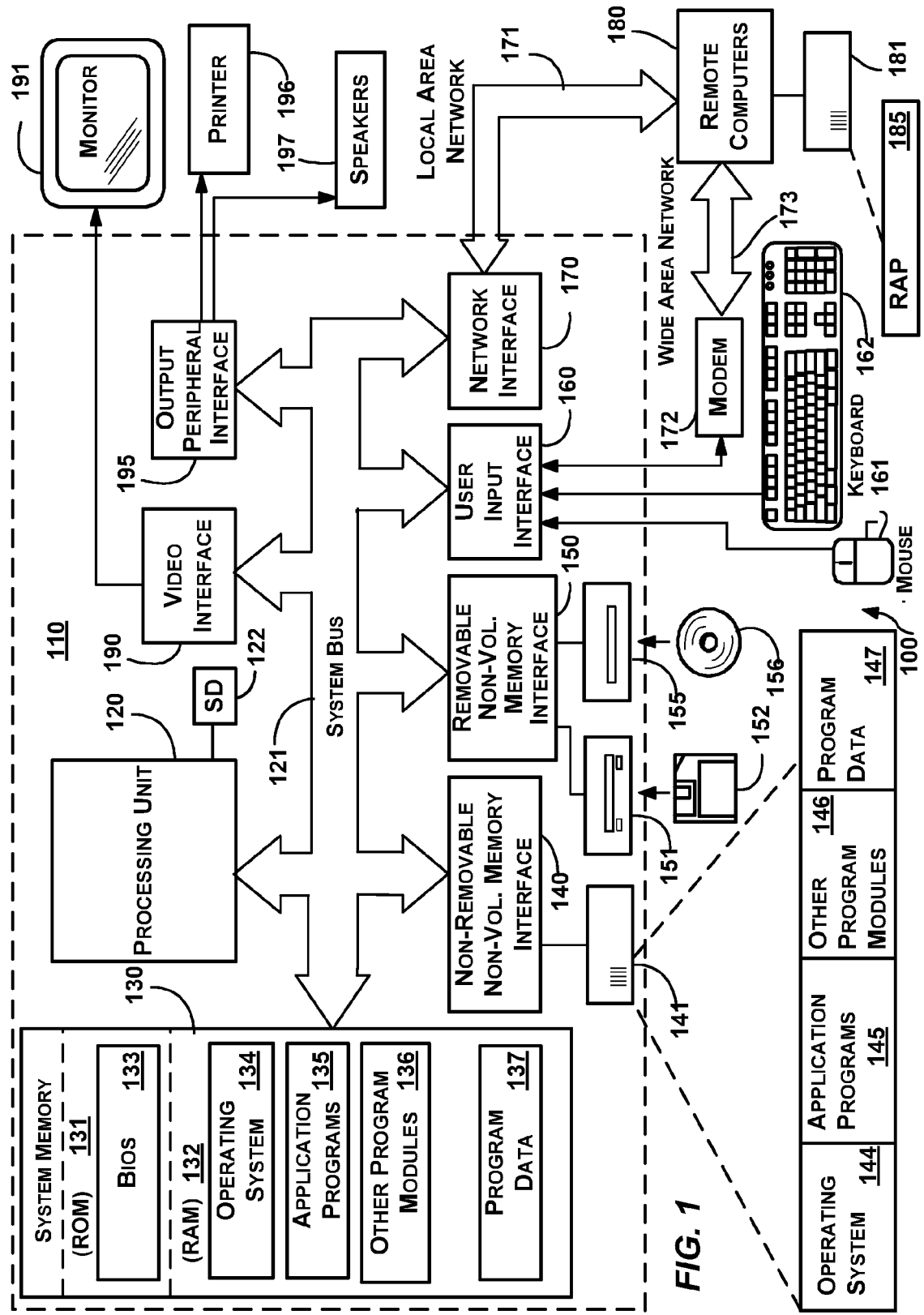
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media. Computer-readable media does not include communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Privacy in Cloud

As mentioned previously, privacy on the Web is a sensitive issue. FIGS. 2-6 are block diagrams that represent exemplary environments in which aspects of the subject matter described herein may operate. The entities illustrated in FIGS. 2-6 are exemplary and are not meant to be all-inclusive of entities that may be needed or included. In other embodiments, the entities and/or functions described in conjunction with FIGS. 2-6 may be included in other entities (shown or not shown) or placed in sub entities without departing from the spirit or scope of aspects of the subject matter described herein. In some embodiments, the entities and/or services described in conjunction with FIGS. 2-6 may be distributed across multiple devices.

One or more of the entities illustrated in FIGS. 2-6 may be implemented by one or more computing devices. Computing devices may include one or more personal computers, server computers, hand-held or laptop devices, multiprocessor systems, microcontroller-based systems, set-top boxes, programmable and non-programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one or more of the entities illustrated in FIGS. 2-6 comprises the computer 110 of FIG. 1.

Where a line connects one entity to another or where two entities are found in the same figure, it is to be understood that the two entities may be connected (e.g., logically, physically, virtually, or otherwise) via any type of network including a direct connection, a local network, a non-local network, the Internet, some combination of the above, and the like. For example, a line may represent one or more local area networks, wide area networks, direct connections, virtual connections, private networks, virtual private networks, some combination of the above, and the like.

One or more of the entities illustrated in FIGS. 2-6 may be implemented in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual optical device, may communicate via a virtual network adapter, and so forth.

More than one virtual machine may be hosted on a single computer. That is, two or more virtual machines may execute on a single physical computer. To software executing in each virtual environment, the virtual environment appears to have its own resources (e.g., hardware) even though the virtual machines hosted on a single computer may physically share one or more physical devices with each other and with the hosting operating system.

Figure 2:
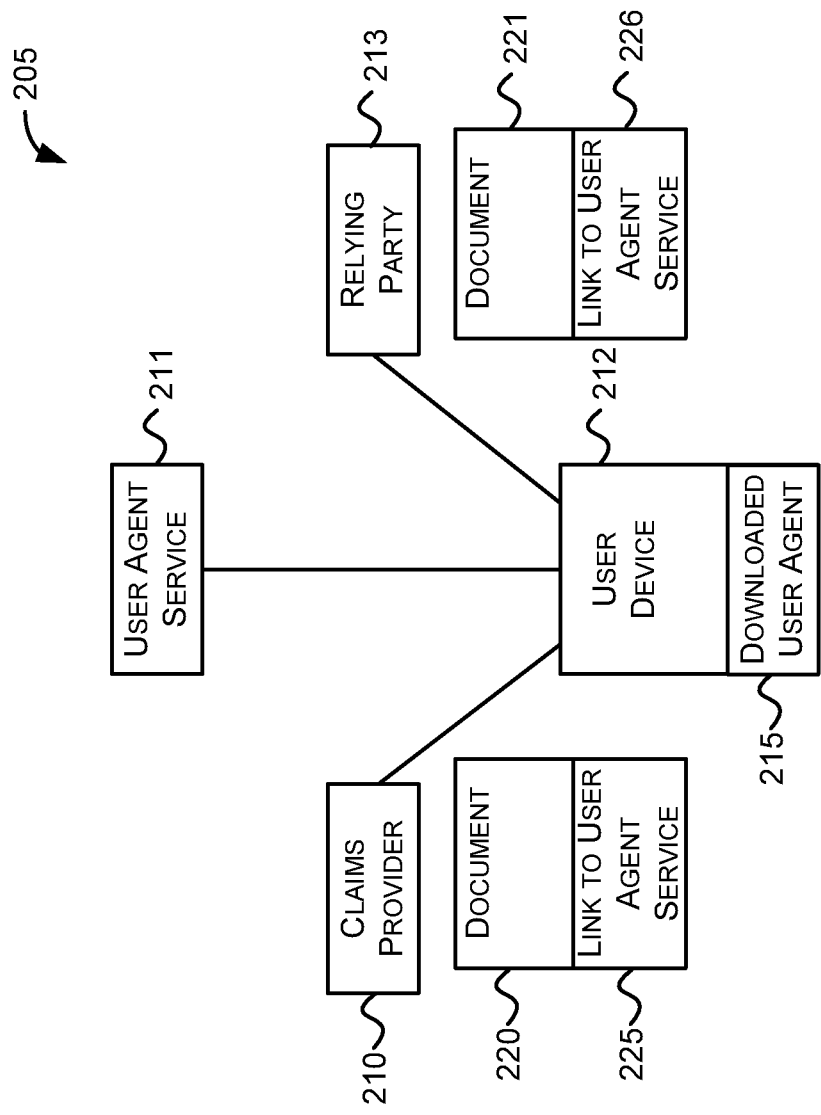
FIGS. 2-6 are block diagrams that represent exemplary environments in which aspects of the subject matter described herein may operate.

Turning to FIG. 2, the system 205 may include a claims provider 210, a user agent service 211, a user device 212, a relying party 213, and other entities (not shown). As used herein, the term entity is to be read to include all or a portion of one or more devices, a service, a collection of one or more software modules or portions thereof, some combination of one or more software modules or portions thereof and one or more devices or portions thereof, and the like.

A service may be implemented using one or more processes, threads, components, libraries, and the like that perform a designated task. A service may be implemented in hardware, software, or a combination of hardware and software. A service may be distributed over multiple devices or may be implemented on a single device.

A user may seek to access goods, services, data, resources, or other information provided by the relying party 213. The user may be a natural person or persons, a computer, a network, any other entity, or the like.

Sometimes herein, the term "services" is used to indicate something that the relying party may provide. A service may include data, resources, or other information that may be provided by the relying party 213.

Furthermore, sometimes the term "user" is used to reference the entity that is seeking to access the services of the relying party 213. It is to be understood, however, that the term user may include a natural person or persons, one or more computers, networks, other entities, combinations of two or more of the above, or the like.

Before providing access to a service, the relying party 213 may require one or more verified claims regarding the user seeking access to the service. Verified claims may be issued by one or more claims providers that the relying party 213 trusts. A claims provider may authenticate a user before providing a claim. A claims provider may "partially" sign issued claims to provide evidence that the claims provider issued the claims.

The term "partially" sign is used to indicate that a claims provider may provide data that allows the user device 212 to complete the signature of the claims. The user device 212 completes the signature by using a function or data passed to the user device 212 by the claims provider. This is done, in part, so that the claims provider cannot later collude with the relying party 213 or any other entity to identify the user for whom the claims are provided. In addition, the function or data passed to the user device 212 may be tied to claims such that it cannot be used to sign other claims.

In some examples, a relying party may be any resource, privilege, or service that requires one or more valid claims to enter, access, or use. For example, a relying party may include: a computer, a computer network, data, a database, a building, personnel, services, companies, organizations, physical locations, electronic devices, or any other type of resource.

In one embodiment, a claim is an assertion of the truth of something. For example, a claim may convey an identifier (e.g., student number, logon name, other identifier, or the like). A claim may assert that the user knows a given key (e.g., a response to a challenge, a password, or the like). Claims may convey personally identifying information such as name, address, data of birth, citizenship, and the like. A claim may assert that a user is part of a certain group. For example, a claim may indicate that a user is over 18 years old. As another example, a claim may indicate that a user is part of a group with specific permissions.

Some familiar examples of types of claims include: first name, last name, email address, street address, locality name or city, state or province, postal code, country, telephone number, social security number, date of birth, gender, personal identifier number, credit score, financial status, legal status, and the like. It will be understood, however, that the above types of claims are exemplary only and that those skilled in the art may utilize other claims without departing from the spirit or scope of aspects of the subject matter described herein.

Sometimes, a claims provider may be referred to as an identity provider in the sense that the claims provider may provide something that identifies a characteristic of the user. In some implementations, one or more claims providers may reside on a network or in the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

In some implementations, one or more claims providers may reside on the user device 212. For example, the user device 212 may host a health claims provider, a biometric claims provider, other claims providers, and the like. In some implementations, one or more claims providers may be part of a trust framework that a relying party trusts.

To help protect against deception, the claims provider 210 may obtain data from the user, the user device 212, and/or a physical device of the user. For example, the claims provider 210 may ask one or more challenge questions to which the user must respond, receive a PIN, password, or other user-known data from the user, obtain, with consent, biometric data (e.g., fingerprint, retina, DNA, or other biometric data), receive a code from a portable item (e.g., a USB key, smart card, or the like), obtain other credentials, a combination of two or more of the above, and the like.

If the claims provider 210 is satisfied that the entity requesting a claim is the user, the claims provider 210 may provide the user with data that has been signed by the claims provider 210 in such a way as to make it difficult or infeasible to change or forge the data. This data may include or be linked to one or more claims. The user device 212 may present the data to the relying party 213 to provide one or more claims. If the data includes more claims than is required by the relying party 213, the user may present just the required claims while still presenting the signature or other data that indicates that the data has not been tampered with.

A user may not want the claims provider 210 to know the relying parties with which the user is interacting. The user may also not want the relying party to know any more information about the user than is necessary for interacting with the relying party. To avoid these undesirable events, privacy boundaries may be erected. A privacy boundary ensures that certain data is not transmitted across the boundary. For example, a privacy boundary may be erected between the user and the relying party 213 and another privacy boundary may be erected between the user and the claims provider 210. While the user device 212 may have access to all data included in both boundaries, data inside one privacy boundary may not be allowed to pass to an entity outside the privacy boundary without user consent.

To avoid the claims provider 210, the relying party 213, or both from tracking the interactions of the user or otherwise gathering data about the user, certain actions may be taken. For example, in one implementation, when a user device 212 seeks to access a service or resource of a relying party, the following actions may occur:

1. The user device 212 may contact the relying party 213. For example, if the user device 212 is hosting a Web browser, a user may type an address of a relying party in an address bar of the Web browser. In response, the Web browser may send a request to the relying party 213.

2. In response to the request, the relying party 213 may redirect the user device 212 and provide a document 221 (e.g., an HTML, XML, or other document). The document 221 may include a reference 226 to the user agent service 211. The document 221 may also include a set of claims required by the relying party 213 in order for the relying party 213 to provide the requested information. The document 221 may include a list of claims providers 210 and/or a trust framework that the relying party 213 trusts.

3. In one embodiment, the user device 212 may then use the document 221 to request code from the user agent service 211. Sometimes the user agent service 211 may be referred to as a policy service. The code that is downloaded from the user agent service 211 is sometimes referred to as the downloaded user agent 215.

In another embodiment, the code is not requested from the user agent service 211. Instead, the code is already on the user device 212 having been previously downloaded. In this embodiment, the relying party 213 may redirect the user to the user agent executing on the user device 212. The relying party 213 may also provide the document 221 to the user agent already on the user device 212.

In yet another embodiment, the user agent may execute as a service in the cloud. In this embodiment, the document from the relying party 213 may be provided to the user agent which may then drive obtaining claims to satisfy the relying party 213. In this embodiment, the downloaded user agent 215 refers to code that runs in the cloud. The code may have been downloaded to the cloud by the user, the user's company, or another entity that the user trusts.

4. In response to the request, the user agent service 211 may provide code to the user device 212. The code may implement a protocol the user device 212 may follow to obtain signed claims from the claims provider 210 and provide these claims to the relying party 213 without revealing data that may be used to track the user device 212. The code may be executed on the user device 212 and is sometimes referred to herein as the downloaded user agent 215. In another embodiment, the code may be executed in the cloud and the code is not downloaded to the user device 212.

5. The downloaded user agent 215 may evaluate the document 221 to determine the claims required by the relying party 213. The downloaded user agent 215 may also evaluate the document 221 to determine what claims providers and/or trust framework the relying party 213 trusts.

6. If the claims are already stored on the user device 212 (e.g., in a cache) or on a separate device (e.g. a smart card) and the claims are such that they may be used to respond to the relying party 213, the stored claims may be presented to the relying party. For example, although the claims may be stored on the user device or attached storage device, they may be restricted such that they are not allowed to be provided to the relying party 213. For example, the claims may be restricted by time, number of disclosures to relying parties, to certain relying parties only, or the like. Claims may be stored in the form of tokens where a token may include one or more claims and an electronic signature of a claims provider.

7. In one embodiment, if any claims required by the relying party 213 are missing from the user device 212, the downloaded user agent 215 may redirect the user to a claims provider to obtain a new set of claims from the claims provider 210. In another embodiment, for any claims that are not already stored on the user device 212 or that are stored but are not usable to respond to the relying party 213, the downloaded user agent 215 may then interact with the claims provider 210 to obtain signed claims that may be presented to a token provider to obtain a token to provide to the relying party 213 to obtain the service. Obtaining the signed data may involve communicating with a protocol gateway and providing data that may be used to authenticate the user.

The protocol gateway may communicate with an access control service that is federated and can provide authentication across multiple companies. The access control service may communicate with one or more identity providers to obtain claims requested by the user device 212. After receiving claims, the access control service may return the claims to the protocol gateway or some other entity which may sign and return the claims to the user device 212.

Signing the data may be done in such a way that the claims provider 210 does not see the key by which the data is signed. This may be done as indicated previously by providing the user device 212 with a function or other data that allows the user device 212 to complete the signing the claims with a key of the user device 212. This may be done, for example, to avoid allowing the claims provider 210 to track the interactions of the user either by itself or even working together with the relying party 213. The claims provider 210 may provide the claims to the downloaded user agent 215 via the document 220. The document 220 may also include a reference 225 to the user agent service 211. In browsers, including this link allows the downloaded user agent 215 to store and maintain state obtained from the relying party and the claims provider without invoking security problems (e.g., cross-site scripting).

8. After obtaining signed claims, the downloaded user agent 215 may provide any claims required by the relying party 213 to the relying party 213 together with proof of signature. In one implementation, the downloaded user agent 215 may first communicate with a token issuer to create a token that may be provided to the relying party 213. This token may be created such that the token issuer is not aware of the relying party 213 to which the token will be presented. This token may also be partially signed by the token issuer with a completed signature generated by the user device 212.

9. Upon receipt of the signed claims, the relying party 213 may verify that the claims are validly signed and that the claims are sufficient for the requested service. In one implementation, the relying party 213 may validate the claims itself. In this implementation, the relying party may also have the means to decrypt the token. Alternatively, the relying party may consult a validation service to verify that the claims are validly signed. For privacy, one or more of the claims in the token may be obscured from the relying party 213 and the validation service.

10. If the claims are validly signed and sufficient for the requested service, the relying party 213 may provide the requested service to the user device 212.

Based on the teachings herein, those skilled in the art may recognize other mechanisms or procedures for accomplishing avoiding tracking the interactions of the user or otherwise gathering data about the user. These other mechanisms or procedures may also be used without departing from the spirit or scope of aspects of the subject matter described herein For implementation with Web browsers, the claims provider 210 and the relying party 213 may provide Web documents (e.g., the documents 220 and 221) to a browser of the user device 212. The documents may include a reference to the same user agent service 211 and may also include other data needed by the user device 212. Having the reference to the same user agent service 211 may allow the Web browser of the user device 212 to maintain the state data between the claims provider 210 and the relying party 213 since the state is held in the same browser session.

When the claims provider 210 sends a document to the user device 212, the document may include a reference to the user agent service 211 and claims. The user device 212 may use the reference to send a request for code to the user agent service 211. If the code has already been downloaded to the user device 212 and cached thereon, the user device 212 may detect this and forgo downloading the code again.

In requesting the code from the user agent service 211, in one embodiment, the user device 212 may avoid sending the claims or other user-identifying information to the user agent service 211. In this manner, the user device 212 may avoid disclosing identifying information to the user agent service 211 that would allow the user agent service 211 to track the activity of the user device 212.

The downloaded user agent 215 obtained from the user agent service 211 and executed on the user device 212 may access the other data of the document as needed to obtain claims and a partial signature from the claims provider 210.

The downloaded user agent 215 may also provide the obtained claims or a subset thereof as appropriate to the relying party 213. In obtaining the claims and signature from the claims provider 210 and providing claims and a signature to the relying party 213, the downloaded user agent 215 may store state in a browser specific memory of the user device 212. The state is obtained from interactions between the user device 212 and the relying party 213 and the user device 212 and the claims provider 210. This state may be stored for and in the context of a Web browser session and deleted in conjunction with the Web browser closing.

Figure 3:
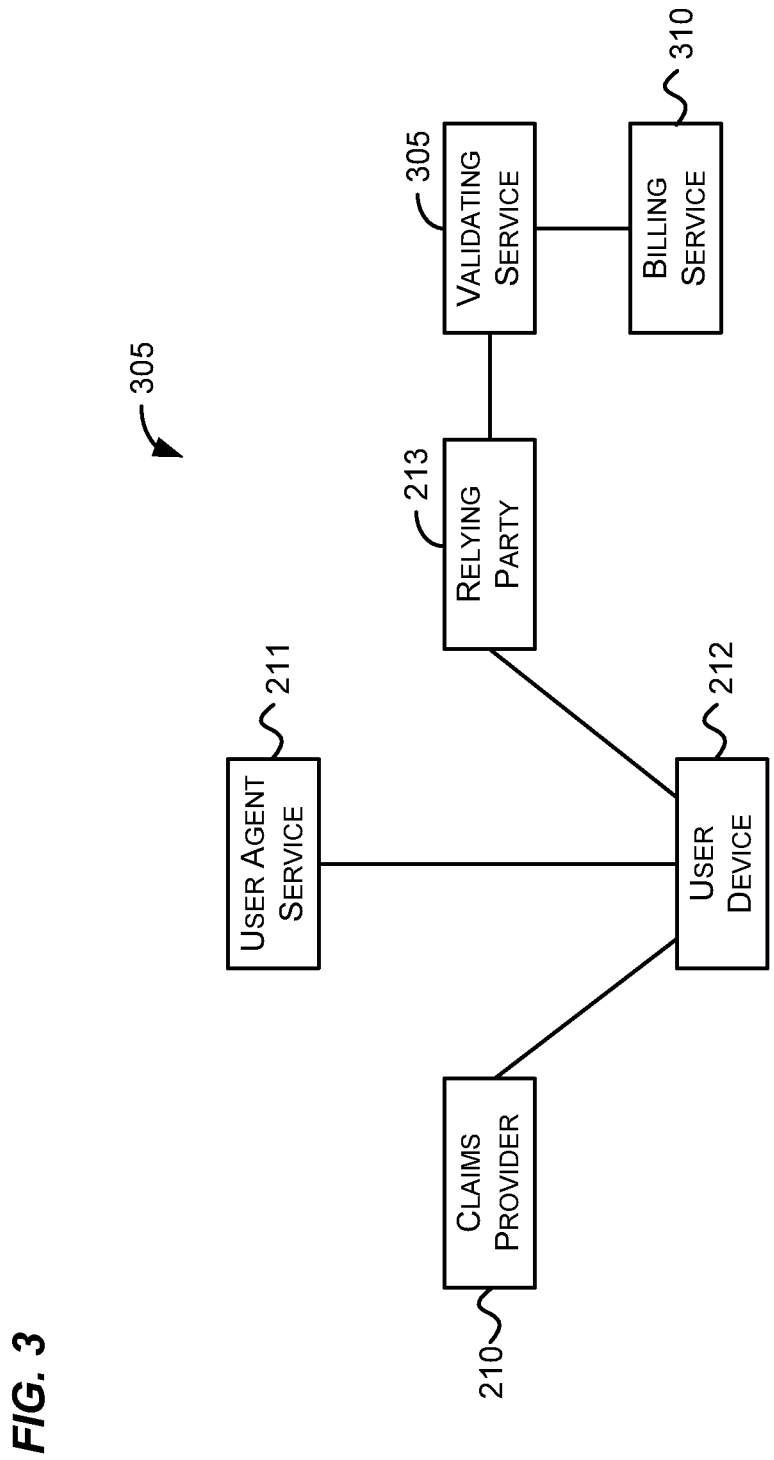

Turning to FIG. 3, the system 205 may include a claims provider 210, a user agent service 211, a user device 212, a relying party 213, and other entities (not shown). The relying party 213 may employ a validating service 305 to validate claims provided by the user device 212. The validating service 305 may include validating methods to verify that the claims have not been tampered with subsequent to their being signed. This may involve digital signature verification techniques as is known to those skilled in the art.

In one embodiment, the validating service 305 may be able to decrypt the claims provided by the user device 212. In another embodiment, the validating service 305 may not be able to decrypt the claims provided by the user device 212. With various signature validation techniques, validation may be performed in either embodiment.

Being able to call on the validating service 305 to validate the claims of the user frees the relying party 213 from the task of implementing validation code. In some cases, however, the relying party 213 may wish to implement its own validation code and place it on a component of the relying party 213. Having the validation code as a part of the relying party 213 is within the spirit and scope of aspects of the subject matter described herein.

Having the validating service 305 does not compromise the privacy boundary established around the claims provider 210. The validating service 305 receives at most the claims that the relying party 213 received. As such, the validating service 305 does not obtain any more information than the relying party 213 obtained from the user. If the information received by the relying party 213 is not sufficient to allow the relying party 213 to determine the additional information about the user, it is likewise insufficient for the validating service 305 to determine the additional information of the user.

The validating service 305 may be connected to the billing service 310. The billing service 310 may charge relying parties who rely on a claims provider to authenticate their users. Billing based on tracking which individual users consume specific services may be inappropriate and constitute a privacy concern for the relying party and/or the individual user. The billing service 310 may calculate a total usage of claims from claims providers by relying parties without tracking which individual users employ which relying parties. Indeed, with the limited information provided by the user device 212 across the privacy boundaries and subsequently to the billing service 310, the billing service 310 may not have sufficient information to identify a user of the user device 212. This enables a viable business model for claims providers while mitigating privacy concerns.

In one example, a relying party may remove or obscure claims from a token before sending the claims to the validation service to preserve privacy of the user and/or the relying party. With various encryption techniques, removing or obscuring the claims may be performed in such a way that it does not break the signature of the token.

Because the billing service 310 is also outside of the privacy boundary that includes the claims provider 210, the billing service 310 may not determine any more information about the user than the relying party 213 and the validating service 305. The billing service 310 may be informed of the claims provider that provided the claims. This may be determined, for example, via an identifier and/or signature conveyed in conjunction with the claims. The billing service 310 may also be informed of the relying party 213. This may be done, for example, explicitly via the validating service 305 or the relying party 213, via a token that encapsulates the claims, via an address (e.g., URL, domain name, or the like) associated with the relying party 213, or in other ways. Using this information, the billing service may maintain a count associated with each claims provider and each service provider and may bill service providers and/or claims providers based on the count.

Figure 4:
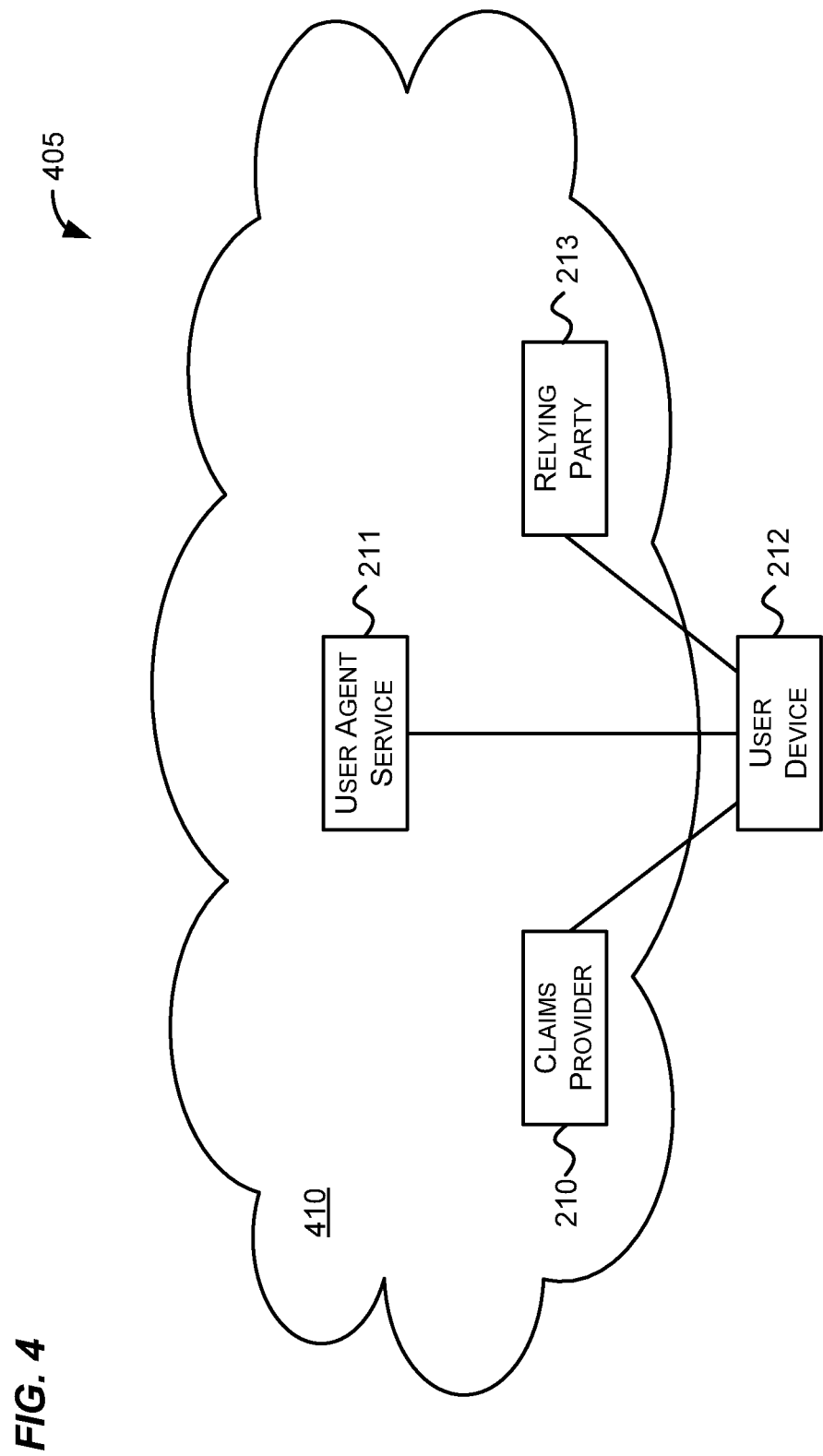

Turning to FIG. 4, the system 405 may include the claims provider 210, the user agent service 211, the relying party 213, the user device 212, and other entities (not shown). The claims provider 210, the user agent service 211, the relying party 213, and other entities may be placed in the cloud 410. In alternative examples, one or more of the claims provider 210, the user agent service 211, and the relying party 213 may be placed in the cloud 410 and one or more of them may be located outside the cloud 410.

Even when one or more of the entities illustrated in FIGS. 2 and 3 are placed into the cloud and even if all the entities (including or excepting the user device 212) are under the control of a single entity (e.g., a cloud operator), privacy may be maintained via the techniques mentioned previously. Based on the teachings above, through interaction with the user device 212 or even colluding with the relying service 213, without additional information, the claims provider 210 may not able to determine the relying party 213 for which the user is seeking signed claims. Furthermore, without additional information, the relying party 213 may not be able to determine additional information usable to determine the natural identity of the user. At the same time, however, an entity that owns the service providers can still control access to the services as desired.

A cloud operator may provide identity services for the benefit (e.g. on behalf of, for, as a service to, or the like) of a relying party. A cloud operator may be an entity that controls one or more computers in the cloud. These computers may host one or more of the claims provider 210, user agent service 211, relying party 213, and the user device 212. Whether or not the various entities of the system 405 are included in the cloud, the user agent executing on the user device 212 erects a privacy boundary that prevents identity information sufficient to determine a natural identity of a user using the user device 212 from passing outside of the user device 212 without user consent. The privacy boundary may ensure that even when combined (e.g., two or more entities of the system 405 collude) the identity information sent from the user device 212 to various entities outside the user device 212 is still insufficient to determine a natural identity of the user.

In one example, the privacy boundary may obscure natural identity information through encryption by a key know to the user agent but not to computers controlled by the cloud operator. In another example, the privacy boundary may omit natural identity information. Natural identity information may include information that may be used to identify a user in other contexts. For example, a social security number and a birth date may be sufficient to identify an individual in another unrelated transaction while a temporary number assigned to the individual may not be sufficient. As other examples, a birthday and full legal name, an e-mail address, and/or other information may be sufficient to determine a natural identity of a user.

The examples above are not intended to be all-inclusive or exhaustive of what information may constitute natural identity information. Based on the teachings herein, those skilled in the art may recognize other information that may also constitute natural identity information without departing from the spirit or scope of aspects of the subject matter described herein.

A cloud operator may have one or more computers in the cloud that host a trust framework. For example, the trust framework may include a claims provider, a token issuer, a protocol gateway, and a validation service, and/or other entities. In this example, the privacy boundary ensures that data transmitted from the user device to any entity of the trust framework is insufficient to determine the natural identity of the user even when combined with data transmitted by the user device to other entities of the trust framework.

A relying party may be willing to accept signed claims from any of a number of claims providers. In one embodiment, an array of claims providers may be presented to the user. In another embodiment, claims providers for users may be registered in directories, but this may be intrusive if the user participates or present privacy problems if the user does not.

Figure 5:
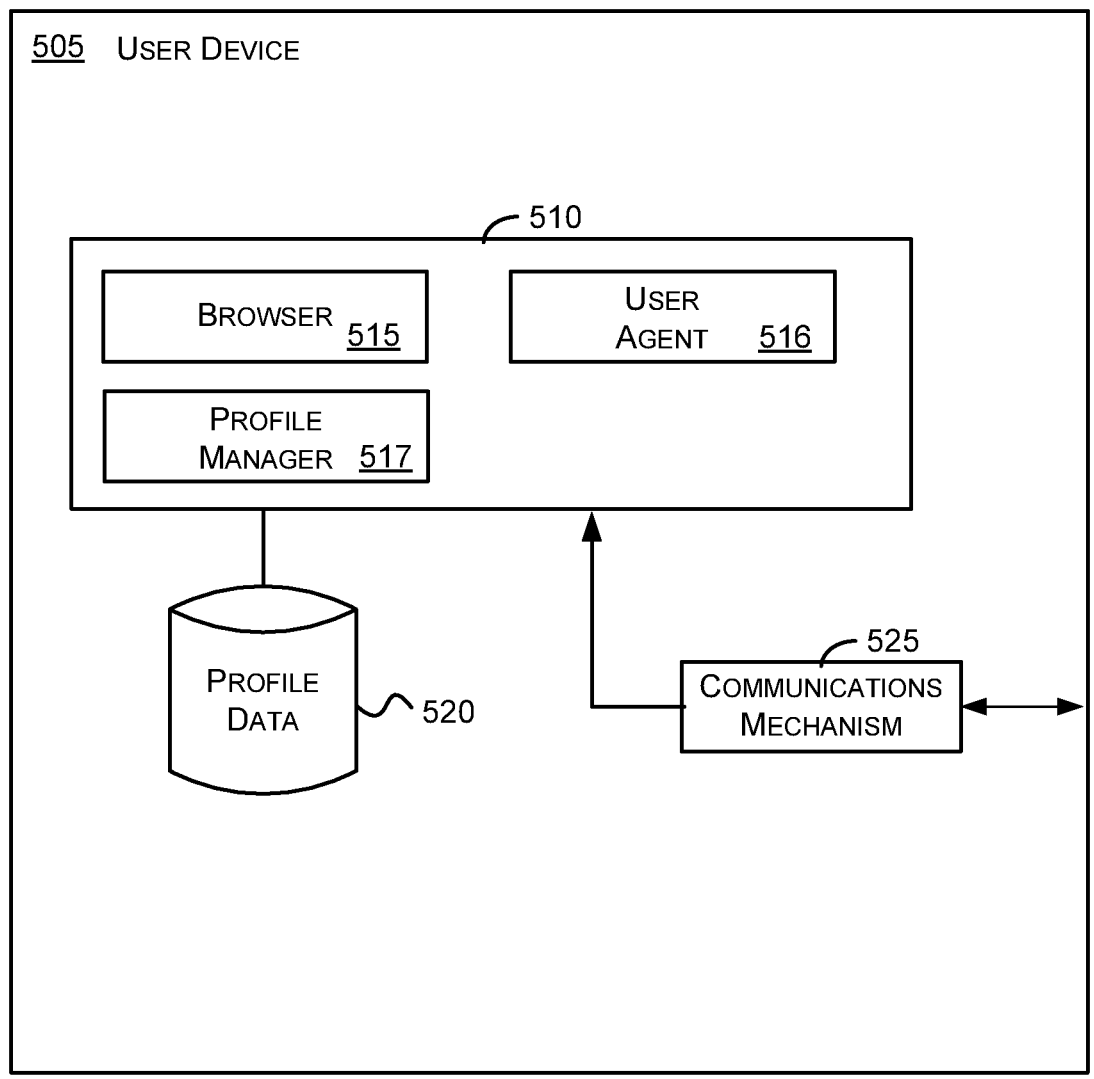

As yet another embodiment, profile data stored on a user device may be used to predict claims providers with which a user is likely familiar. FIG. 5 is a block diagram representing an exemplary arrangement of components of a user device in which aspects of the subject matter described herein may operate. The components illustrated in FIG. 5 are exemplary and are not meant to be all-inclusive of components that may be needed or included. In other embodiments, the components and/or functions described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices. For example, profile data may be on a removable storage device or on the user device.

Turning to FIG. 5, the user device 505 may include identity components 510, a store 520, a communications mechanism 225, and other components (not shown). The user device 505 may comprise one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the user device 505 comprises a single device, an exemplary device that may be configured to act as the user device 505 comprises the computer 110 of FIG. 1. Where the user device 505 comprises multiple devices, each of the multiple devices may comprise a similarly or differently configured computer 110 of FIG. 1.

The identity components 210 may include a browser 515, a user agent 516, a profile manager 517, and other components (not shown). As used herein, the term component is to be read to include all or a portion of a device, a collection of one or more software modules or portions thereof, some combination of one or more software modules or portions thereof and one or more devices or portions thereof, and the like.

The communications mechanism 525 allows the user device 505 to communicate with other entities. For example, the communications mechanism 525 may allow the user device 505 to communicate with other entities described in conjunction with FIGS. 2-4. The communications mechanism 525 may be a network interface or adapter 170, modem 172, telephone network interface, or any other mechanism for establishing communications as described in conjunction with FIG. 1.

The store 520 is any storage media capable of providing access to profile data. Access as used herein may include reading data, writing data, deleting data, updating data, a combination including two or more of the above, and the like. The store may include volatile memory (e.g., RAM, an in-memory cache, or the like) and non-volatile memory (e.g., a persistent storage).

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 520 may comprise hard disk storage, other non-volatile storage, volatile memory such as RAM, other storage, some combination of the above, and the like and may be distributed across multiple devices. The store 520 may be external, internal, or include components that are both internal and external to the user device 505.

Profile data is data that may be used to determine a set of candidate claims providers with which a user may have a relationship. Profile data may include data from various sources. For example, profile data may include a history of pages browsed by the browser 515, a history of a previous claims provider selections, cookie data, files, cache, or other data on the user device 505, external or local services. Such a profile data may give an indication of claims providers with which a user has established relationships. The profile data may be mined in a privacy-preserving way to discover these potential claims providers.

When a user needs to select claims provider(s) to respond to a relying party, the user may be presented with a list of claims providers mined from the user's profile data. The profile manager 517 may mine the profile data stored on the store 520 and may match the identified claims providers with the claims providers acceptable to a relying party. Identified claims providers may be stored on the store 520 for subsequent use.

In addition to the claims providers found in the profile data, the identity components 510 may also present the user with a link or other user interface element that allows the user to view all the claims providers acceptable to the relying party.

Figure 6:
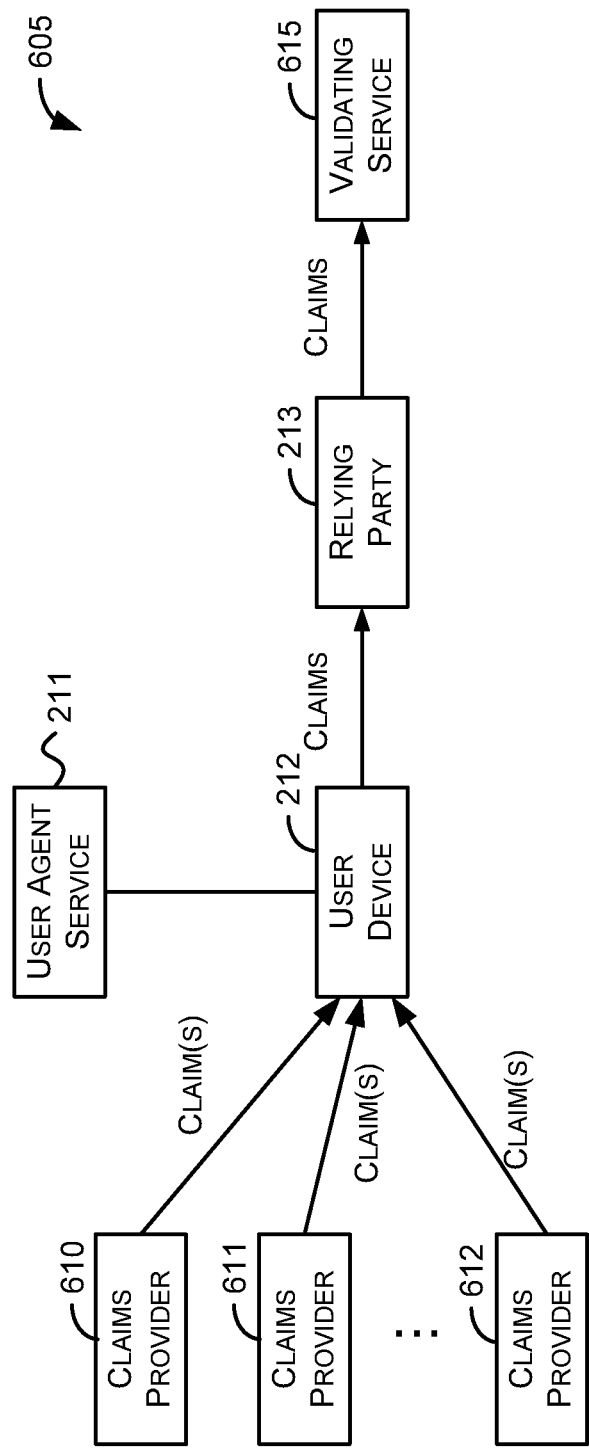

FIG. 6 is a block diagram that represents an exemplary environment in which claims from multiple claims providers are obtained to satisfy a relying party in accordance with aspects of the subject matter described herein. In some cases it may be desirable to obtain claims from multiple claims providers. For example, some relying parties may require added claims for proof. For example, being able to prove that the user has a user name and logon password to one service may not be sufficient. To satisfy a relying party, the user may also need to prove, for example, that the user knows an address, telephone number, or government issued identifier and that the user possesses some physical item. One claims provider may not have sufficient data to provide claims for all that the relying party 213 requires.

To address this issue, the relying party 213 may specify the claims that are needed and allow the user device 212 to satisfy these claims by using multiple claims providers 210. The relying party 213 may indicate the claims required in a single interaction or may request certain claims for certain services and may later request additional claims when the user seeks to access other services (e.g., those that are more restrictive, sensitive, costly, or the like).

The downloaded user agent on the user device 212 may obtain claims from multiple claims providers (e.g., the claims providers 610-612). The user device 212 may send these claims to the relying party 213 without combining them all into a single token. The relying party 213 may send the claims to the validating service 615 which may validate the claims in whatever combinations they are sent, if any, and return an overall validation if all the claims are validated. For example, if the claims provider 610 provides 2 claims, the claims provider 611 provides 1 claim, and the claims provider 612 provides 3 claims, the validating service 615 may validate the 2 claims together, the 1 claim by itself, and the 3 claims together and return a message that the claims are all valid. The validating service 615 may also indicate which sets of claims are valid and which are not.

In one implementation, each set of claims may be provided in a separate token where each token has its own separate signature. In this implementation, 3 tokens may be provided to the validating service 615, where the one token includes 2 claims, one token includes 1 claim, and one token includes 3 claims. The validating service 615 may validate the claims in each token and return multiple messages that indicate which tokens and claims are valid and/or a single message that the claims are all valid after all claims have been validated. In one embodiment, the tokens may be received by the validating service 615 in any order and they may be received at different times.

In one implementation, the claims from the separate claims providers may be combined into one token that is signed or partially signed by a token issuer. The token with the combined claims may then be sent to the relying party.

In one implementation, a claims provider may demonstrate that the user has possession of a physical device such as a telephone or computer or has knowledge of specific data such as a One Time Password (OTP) sent to a cell phone. When a specific service is requested, the relying party may require the user to supplement claims provided by one claims provider with claims about possession of a physical device or knowledge made by another independent claims provider.

Figure 7:
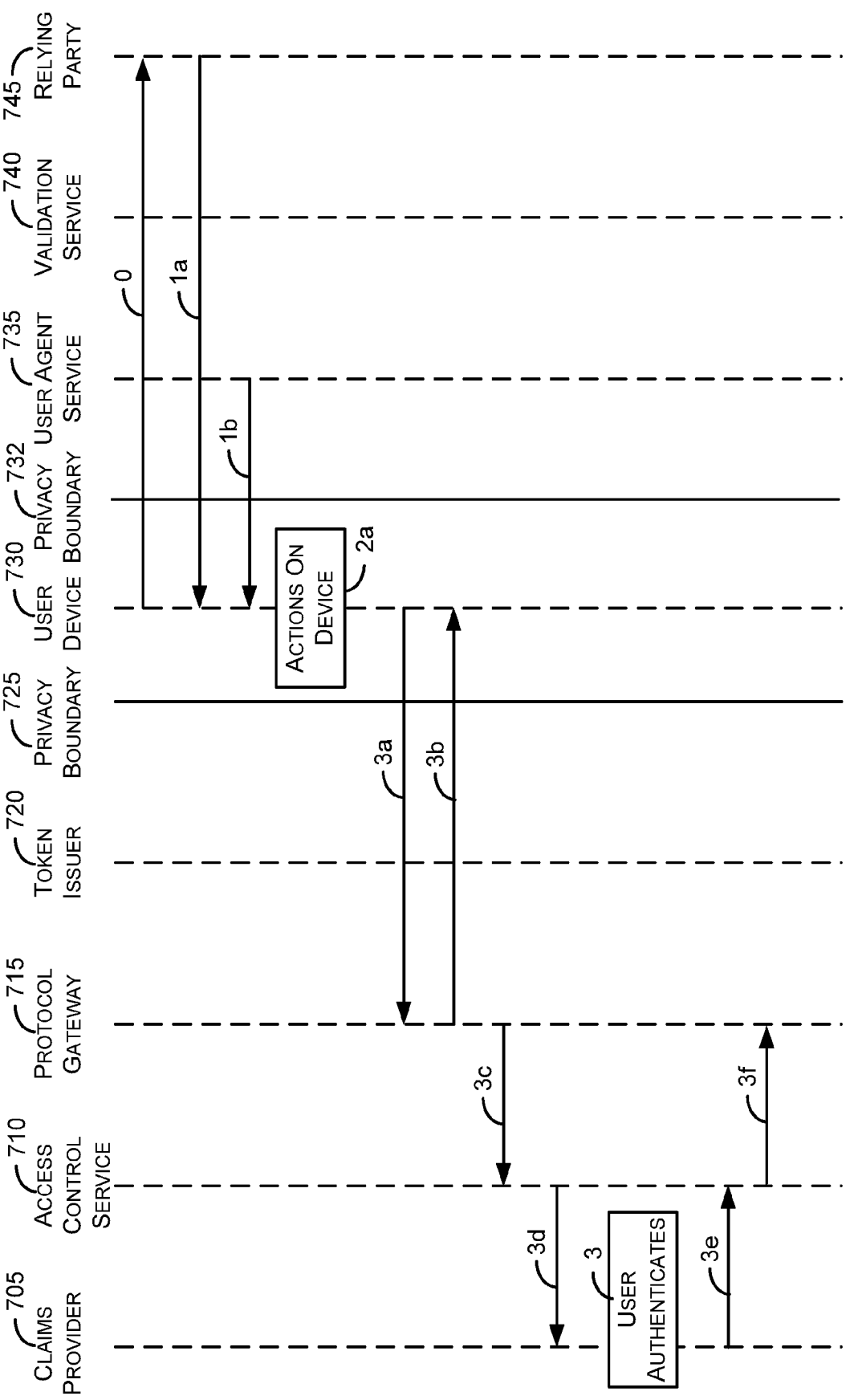
FIGS. 7-8 are timing diagrams in accordance with aspects of the subject matter described herein.
Figure 8:
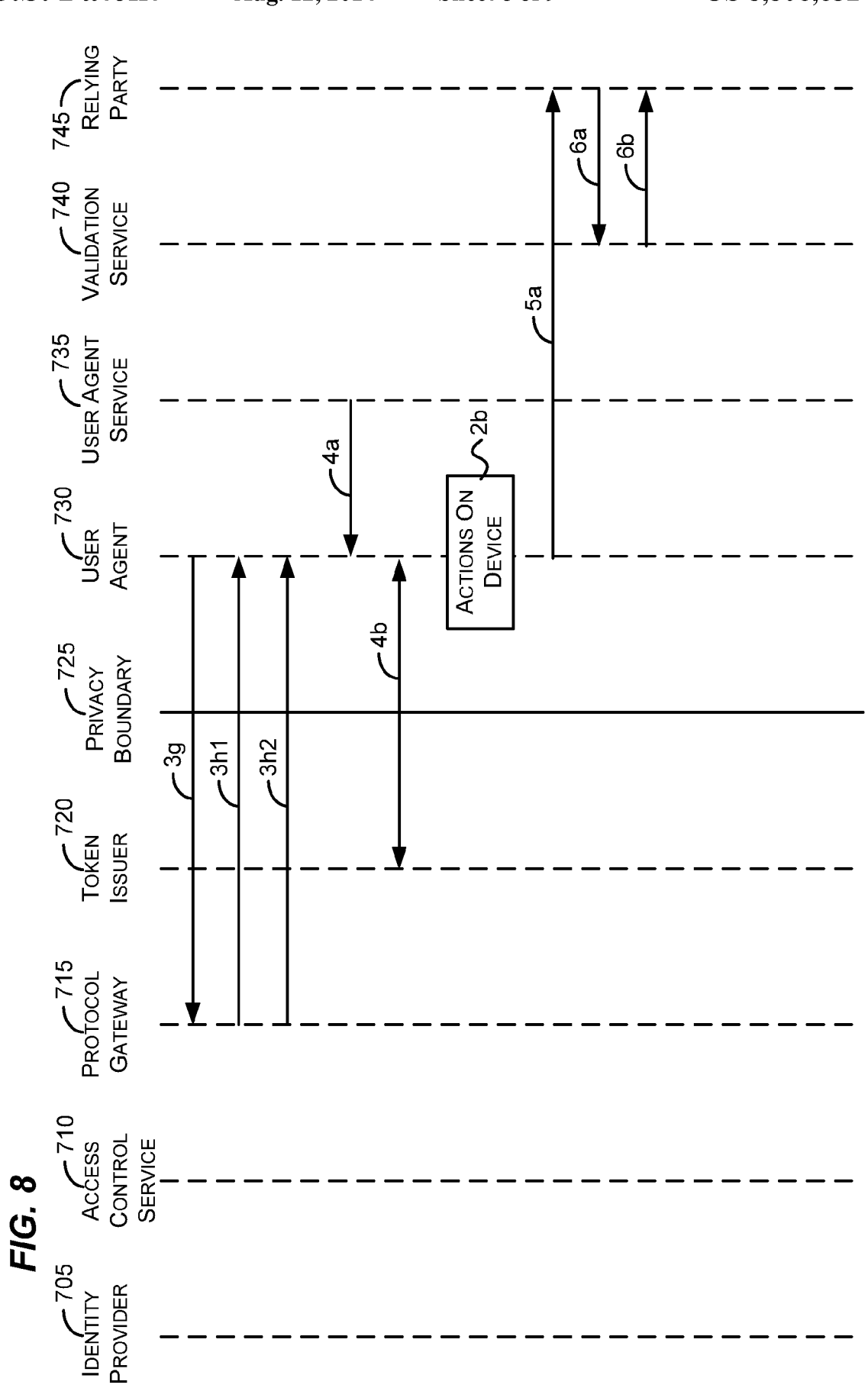

FIGS. 7-8 are timing diagrams in accordance with aspects of the subject matter described herein. Illustrated across the top of the timing diagrams are entities and privacy boundaries that are involved with the actions indicated by the timing diagrams. In particular, there are illustrated a claims provider 705, an access control service 710, a protocol gateway 715, a token issuer 720, a privacy boundary 725, a user agent 730, a privacy boundary 732, a user agent service 735, a validation service 740, and a relying party 745.

At 0, a user may attempt to access a service of a relying party 745. For example, using a browser hosted by the user device 730, a user may send a request such as http://domain-name/servicename/logon.

At 1a, the relying party 745 may redirect the user with a message. The message may include a redirection document that includes a reference to the user agent service 735.

At 1b, the user device 730 may download the user agent from the user agent service 735. User agents may be written in a variety of languages, frameworks, and platforms. Some exemplary user agents may be written in MICROSOFT® SILVERLIGHT®, ADOBE® FLASH®, HTML5, JAVASCRIPT®, and the like. Other exemplary user agents may include code that may execute outside a browser. For example, a user agent may execute as client code on the user device 730, as a phone application, as a service in the cloud, or the like.

At 2a, actions occur on the user device 730. For example, the downloaded user agent may determine if a token is already available on the user device suitable for providing claims to the relying party 745. If so, that token may be provided to the relying party 745. Otherwise, an identity provider may selected by a user.

Context information may be passed with messages. For example, context information is an optional parameter that may be passed in an HTTP get and post. For example, context information may be passed with the redirect message from the relying party. The context information may include information about one or more of which, how, or where the attributes for the entity identified in the digital identity representation will be used. Context may indicate language and/or region or may be a role for which the user will be authenticated.

The context and document obtained from the relying party 745 (or data derived therefrom) may be stored in a memory space reserved and isolated for the downloaded user agent. The user may be shown a consent user interface element and allowed to select the identity provider from which to obtain the claims.

At 3a, the process of obtaining the claims may be initiated with a message to the protocol gateway 715. For example, the downloaded user agent may send a document which includes the requested claims and context but from which the relying party information has been removed.

At 3b, in response, the policy gateway 715 may send a cookie to the user device 730. For example, one form of a cookie may be write cookie (context, stripped policy, identity provider, user agent). A stripped policy is a policy that has been stripped of information identifying the relying party 745.

At 3c, the protocol gateway 715 may send a message to the access control service 710.

At 3d, the access control service 710 may send a message to the claims provider 705.

At 3, the user may authenticate with the claims provider 705. For example, the user may enter a username and password on a user interface on the user device 730.

At 3e, the claims provider 705 may return claims in the form of a response document.

At 3f, the access control service 710 may return claims to the protocol gateway 715 in the form of a response document.

Turning to FIG. 8, at 3g, the protocol gateway 715 may read the cookie previously written to the user device 730. The read may take the form of read cookie (context, stripped policy, identity provider, user agent).

Either 3h1 or 3h2 may be used to return signed claims. At 3h1, signed claims may be posted back to the user agent. At 3h2, signed claims may be loaded by the user agent using a command.

At 4a, the reference (URL) obtained in 3h1 or 3h2 may be used to download the user agent from the user agent 735.

At 4b, tokens may be generated by interacting with the token issuer 720. One form of interaction may include a command such as Generate Tokens (context, Signed Claims, stripped URL).

At 2b, actions are taken on the user device 730. Some exemplary actions include generating and storing tokens on memory space reserved and isolated to the downloaded user agent and finding a policy with a reply address in the memory space set up previously at 2a. For example, the downloaded user agent may see if appropriate tokens are available for responding to the relying party 745. If not, the actions may continue at 2a of FIG. 7. Otherwise, presentation proof may be generated for the relying party 745.

At 5a, the presentation proof is provided to the relying party 745. For example, presentation proof may be provided by sending a message that includes a signed token.

At 6a, the relying party 745 may send a message to the validation service 740 to validate the presentation proof.

At 6b, the validation service 740 may respond with a message that indicates whether the proof is valid. For example, the validation service 740 may respond with a message which indicates whether the claims were valid or not.

Other actions, not indicated may also be performed without departing from the spirit or scope of aspects of the subject matter described herein.

Figure 9:
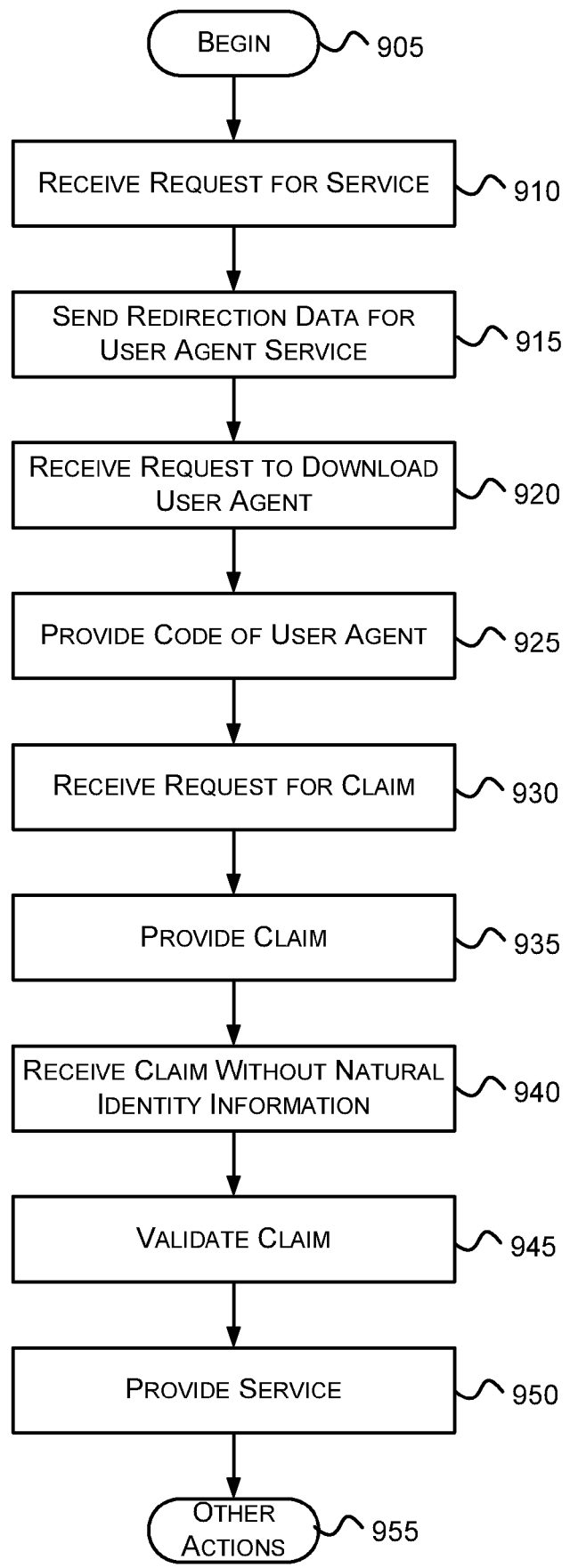
FIG. 9 is a flow diagram that generally represents exemplary actions that may occur in accordance with aspects of the subject matter described herein.

FIG. 9 is a flow diagram that generally represents exemplary actions that may occur in accordance with aspects of the subject matter described herein. For simplicity of explanation, the methodology described in conjunction with FIG. 9 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 9, at block 905, the actions begin. At block 910, a request for a service of a relying party is received at a device connected to the Internet. The device is controlled by a cloud operator for the benefit of a relying party. For example, referring to FIG. 4, a device hosting a component for the benefit of the relying party 213 receives a request for a service from the user device 212.

At block 915, in response to the request, a message is sent that includes redirection data. The redirection data indicates a source from which to obtain code for a user agent. The code, when executed, erects a privacy boundary to control transmission of identity information. The privacy boundary prevents identity information sufficient to identify a natural identity of a user from passing from the user agent to the relying party without user consent. For example, a device hosting a component for the benefit of the relying party 213 sends a message that includes redirection data to the user device 212. This redirection data may, for example, include a URL of a service that includes code of the user agent.

At block 920, a request to download the user agent is received. For example, referring to FIG. 4, the user agent service 211 may receive a request to download code of the user agent.

At block 925, code of the user agent is provided. For example, referring to FIG. 4, the user agent service 211 provides code of the user agent to the user device 212.

At block 930, a request for a claim is received. The request is received at a device connected to the Internet. The device may also be controlled by a cloud operator. The claims request comes from a user agent. The user agent controls transmission of identity information to devices controlled by the cloud operator so that the identity information transmitted to any one or more of the devices controlled by the cloud operator is insufficient to identity a natural identity of a user using the user device. For example, referring to FIG. 4, a device hosting the claims provider 210 receives a request for a claim.

In one implementation, the user agent may prevent unencrypted natural identity information from being transmitted from the user device to any entity controlled by the cloud operator unless user consent is given. Natural identity information may include any information sufficient when combined with any other information available to the cloud operator.

In one implementation, natural identity information may be obscured through encryption (e.g., via a key known to the user agent but not to the relying party or the claims provider) when sending the natural identity information outside the user device 212.

In another implementation, natural identity information may be removed or omitted from messages sent from the user agent to the relying party. In other implementations, natural identity information may be obscured/omitted in other ways described herein.

At block 935, the claim is provided. After authenticating the user, device hosting the claims provider 210 may provide a partially signed claim that includes evidence (e.g., a signature) that the claims provider 210 provided the claim.

At block 940, the claim is received a device hosting a service of the relying party. For example, referring to FIG. 4, the claim is received as part of a token at a device hosting a component for benefit of the relying party 213.

At block 945, the claim is validated. For example, referring to FIG. 3, a validating service 305 validates the claim to determine whether the claim includes evidence that the claim comes from a valid claims provider.

At block 950, if the claim is valid, access to a service is provided. For example, referring to FIG. a device hosting a service of the relying party 213 provides the requested service. The device hosting the service of the relying party 213 may also be controlled by the cloud operator without compromising the natural identity of the user using the user device 212.

At block 955, other actions, if any, may be performed.

Although some of the discussion above has referenced data passed via HTTP, the same techniques may also be applied with other technologies without departing from the spirit or scope of aspects of the subject matter described herein. For example, messages and data may be transferred between the different entities illustrated in FIGS. 7 and 8 through the use of the Simple Object Access Protocol (SOAP), Simple Mail Transfer Protocol (SMTP), Asynchronous JavaScript and XML (AJAX) techniques, Transmission Control Protocol (TCP)/Internet Protocol (IP) or other protocols to transfer data over networks, XML, a combination of two or more of the above, or the like.

Although some of the above discussion has referenced Web browsers, the same techniques may also be applied to environments without Web browsers without departing from the spirit or scope of aspects of the subject matter described herein. For example, the functions of the code may be implemented by applications of mobile devices, software that is installed on computers, chips that implement one or more functions of the code, and the like. Furthermore, it is contemplated that Web browsers may be modified to incorporate some or all of the code downloaded from the user agent service 211 such that none or only some of the code may need to be downloaded from the user agent service 211.

As can be seen from the foregoing detailed description, aspects have been described related to identity technology. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    at a communications interface of a device connected to the Internet, receiving a service request for a service of a relying party, the device controlled by a cloud operator for benefit of the relying party; and
    in response to the service request, sending, from the device, a message that includes redirection data, the redirection data indicating a source from which to obtain code for a user agent, the code, when executed, erecting a privacy boundary to control transmission of identity information, the privacy boundary preventing identity information sufficient to identify a natural identity of a user from passing from the user agent to the relying party without user consent.

2. The method of claim 1, further comprising, at a claims provider, receiving from the user agent a claims request for a claim, the claims provider also controlled by the cloud operator, the privacy boundary preventing unencrypted natural identity information received from the claims provider from passing from the user agent to the relying party without user consent if the natural identity information received from the claims provider is sufficient to identify a natural identity of the user when combined with information available to the cloud operator.

3. The method of claim 2, further comprising receiving the claim at the communications interface of the device, the claim conveyed in a message that has the natural identity information sufficient to identify the natural identity of the user obscured through encryption.

4. The method of claim 3, wherein the natural identity information is obscured through encryption by a key known to the user agent but not to the relying party or the claims provider that provided the claim to the user agent.

5. The method of claim 2, wherein the natural identity information is omitted from messages sent from the user agent to the relying party.

6. The method of claim 1, further comprising providing the service via a device controlled by the cloud operator, the privacy boundary preventing identity information sufficient to identify the natural identity of the user from passing from the user agent to the service without user consent.

7. The method of claim 1, wherein sending a message that includes redirection data comprises sending a URL of a service that includes the code of the user agent.

8. In a computing environment, a system, comprising:
    one or more computers that are controlled by a cloud operator to provide identity services for benefit of at least a relying party, the one or more computers configured to perform actions, comprising:
        receiving, from a user device, a service request for a service of the relying party;
        in response to the service request, sending a message that includes redirection data, the redirection data indicating a user agent service from which to obtain code for a user agent, the code, when executed, erecting a privacy boundary to control transmission of identity information, the privacy boundary preventing identity information sufficient to identify a natural identity of a user from passing from the user agent to a computer controlled by the cloud operator without user consent.

9. The system of claim 8, wherein the user agent service is hosted by one or more of the one or more computers that are controlled by the cloud operator, the privacy boundary preventing identity information received from the user agent service and usable to determine the natural identity of the user from passing from the user agent to a computer controlled by the cloud operator without user consent.

10. The system of claim 8, wherein one or more of the one or more computers host a claims provider operable to receive from the user agent a claims request for a claim, the privacy boundary preventing identity information received from the claims provider and usable to determine the natural identity of the user from passing from the user agent to a computer controlled by the cloud operator without user consent, wherein the identity information received from the claims provider is sufficient to identify a natural identity of the user when combined with information available the one or more computers that are controlled by the cloud operator.

11. The system of claim 10, wherein one or more of the one or more computers are operable to receive the claims request in a message that has the natural identity information obscured through encryption by a key known to the user agent but not to a computer controlled by the cloud operator.

12. The system of claim 10, wherein one or more of the one or more computers are operable to receive, from the user agent, the claims request in a message that has the natural identity information omitted.

13. The system of claim 8, wherein one or more of the one or more computers host a service of the relying party, the privacy boundary preventing identity information sufficient to identify the natural identity of the user from passing from the user agent to the service without user consent.

14. The system of claim 8, wherein the one or more computers that send the message send a message that includes a URL of a service that includes the code of the user agent.

15. The system of claim 8, wherein the user device is hosted by one or more of the one or more computers, the privacy boundary preventing information sufficient to identify the natural identity of the user from passing from the user device to another of the one or more computers without user consent.

16. The system of claim 8, wherein the one or more computers host a trust framework that includes a claims provider, a token issuer, a protocol gateway, and a validation service, wherein the privacy boundary ensures that data transmitted from the user device to any entity of the trust framework is insufficient to determine the natural identity of the user even when combined with data transmitted by the user device to other entities of the trust framework.

17. A computer storage medium having computer-executable instructions, which when executed perform actions, comprising:
- at a communications interface of a device connected to the Internet, receiving a claims request for a claim provided by a claims provider, the device controlled by a cloud operator, the claims request coming from a user agent, the user agent previously obtained by downloading code from a user agent service indicated by a relying party device, the code, when executed, erecting a privacy boundary to control transmission of identity information to devices controlled by the cloud operator so that the identity information transmitted to any one or more of the devices controlled by the cloud operator is insufficient to identify a natural identity of a user using the user device; and
- in response to the claims request, providing a partially signed claim to the user device, the partially signed claim including evidence that the claims provider provided the claim.

18. The computer storage medium of claim 17, further comprising at a relying party device, receiving the claim, the relying party device also controlled by the cloud operator, the privacy boundary preventing unencrypted natural identity information received from the claims provider from passing from the user agent to the relying party device without user consent if the natural identity information received from the claims provider is sufficient to identify a natural identity of the user when combined with information available on any device controlled by the cloud operator.

19. The computer storage medium of claim 18, wherein receiving the claim comprises receiving a fully signed claim, the fully signed claim encrypted using a key known to the user device but not know by any device controlled by the cloud operator, the fully signed claim still including the evidence that the claims provider provided the claim.

20. The computer storage medium of claim 17, further comprising receiving a download request at the user agent service, the user agent service hosted on a device controlled by the cloud operator, the privacy boundary preventing identity information included or conveyed with the code and usable with other information available to the cloud operator to discover a natural identity of the user from being transmitted to any device controlled by the cloud operator.

* * * * *